United States Patent
Lee

(10) Patent No.: US 9,692,349 B2
(45) Date of Patent: Jun. 27, 2017

(54) METHOD, APPARATUS AND SYSTEM FOR CONTROLLING VEHICLE MOTOR BASED ON MOTOR STALL DETECTION

(71) Applicant: Hyundai Motor Company, Seoul (KR)

(72) Inventor: Sung Woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/968,211

(22) Filed: Dec. 14, 2015

(65) Prior Publication Data
US 2017/0133970 A1    May 11, 2017

(30) Foreign Application Priority Data
Nov. 10, 2015  (KR) .................. 10-2015-0157111

(51) Int. Cl.
G01R 31/02    (2006.01)
H02P 29/024    (2016.01)

(52) U.S. Cl.
CPC .................. *H02P 29/024* (2013.01)

(58) Field of Classification Search
CPC ............. H02H 7/08; H02P 29/02; H02P 6/12
See application file for complete search history.

(56) References Cited

U.S. PATENT DOCUMENTS 6,495,981 B2    12/2002   Romanowich et al.
2016/0280256 A1*  9/2016   Wei .................. B62D 5/0409

FOREIGN PATENT DOCUMENTS

| JP | 2009-095101 A | 4/2009 |
| KR | 20120061439 A | 6/2012 |
| KR | 101241169 B1 | 3/2013 |
| KR | 101470225 B1 | 12/2014 |

* cited by examiner

*Primary Examiner* — Karen Masih
(74) *Attorney, Agent, or Firm* — Mintz Levin Cohn Ferris Glovsky and Popeo, P.C.; Peter F. Corless

(57) ABSTRACT

A method, an apparatus and a system for controlling a motor based on motor stall detection are provided. The method includes driving the motor based on an external control signal and receiving information regarding an output voltage of the motor at a predetermined motor detection cycle from a sensor that corresponds to the motor. A bottom value is set by comparing a level of the received output voltage of the motor with a preset limit value and the limit value is changed to the set bottom value when the level of the received output voltage of the motor exceeds the limit value a predetermined number of times corresponding to a predetermined threshold value. Therefore, the present invention has an advantage of adaptively operating a motor based on characteristic change of the motor due to operation durability and external environment change.

20 Claims, 9 Drawing Sheets

FIG. 9
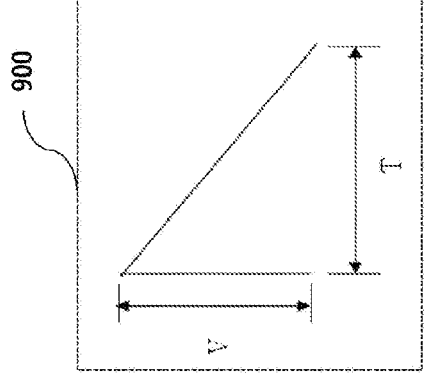
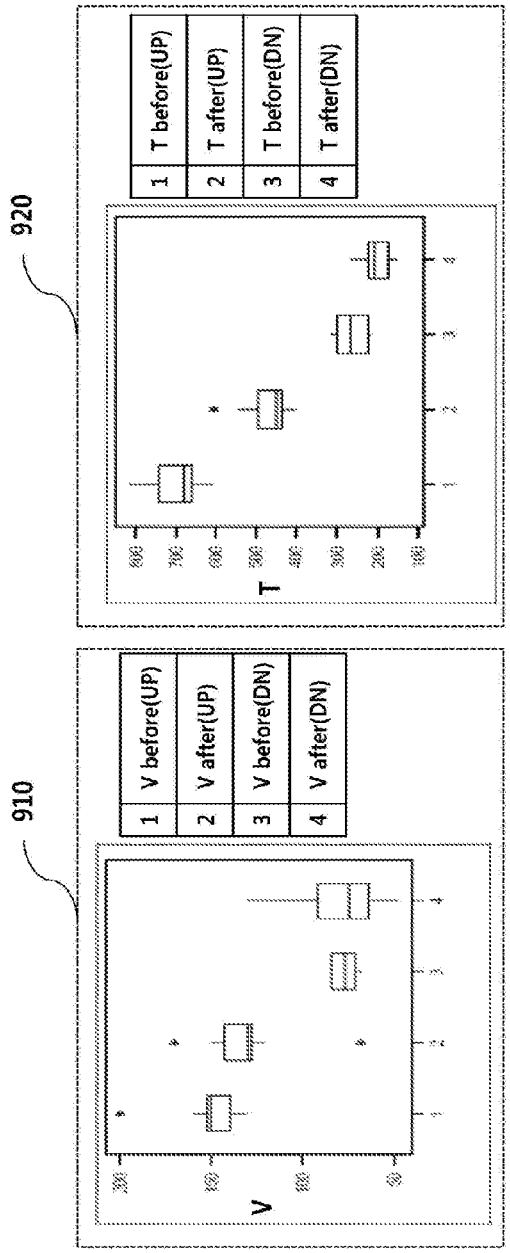

METHOD, APPARATUS AND SYSTEM FOR CONTROLLING VEHICLE MOTOR BASED ON MOTOR STALL DETECTION

CROSS REFERENCE TO RELATED APPLICATION(S)

This application claims the benefit of Korean Patent Application 10-2015-0157111, filed on Nov. 10, 2015, which is hereby incorporated by reference as if fully set forth herein.

BACKGROUND

Field of the Invention

The present invention relates to motor control, and more particularly, to a method, an apparatus and a system for operating a motor based on motor stall detection capable of preventing damage to the motor by controlling an operation of the motor based on motor stall detection.

Discussion of the Related Art

In general, a vehicle includes various motors for convenience of driving, enhancement of fuel efficiency, and passenger convenience. A motor for vehicles restricts limited driving of a driver, and thus requires stall condition control logic, a sensor for the logic, and setting of various limits. In particular, when a position of vehicle equipment such as a seat, an interior side rear view mirror (ISRVM), an exterior side rear view mirror (OSRVM), a rear (RR) curtain, a power window, a wiper motor, etc. needs to be stored or the equipment needs to be driven, there may be difficulty in setting an accurate driving area in each direction and implementing a resolution based on position.

In general, the motor in the vehicle is operated by sensor monitoring and is vulnerable to adjustment of a motor limit value when external noise is applied thereto. In particular, when an initial value of the position of the motor is lost, setting of the driving area may fail. Additionally, overcurrent may occur in the vehicle motor due to a continuous operation and motor stall. When overcurrent continuously occurs, the motor may be damaged. Accordingly, many vehicles include a circuit breaker for blocking supply of power applied to a motor when the motor is overloaded. A device capable of turning power applied to the motor on and off based on whether an abnormal condition, for example, a short circuit condition is detected has been used as the circuit breaker.

Eight schemes described below correspond to representative related art for controlling stall of a motor for vehicles.

In a first scheme, a motor power supply or controller operation stall condition is switched by a disable signal using a limit switch. For example, in a power seat, power applied to a motor may be adjusted by installing an open type limit switch at an end of each rail during a sliding operation, a reclining operation, a tilting operation, etc.

In a second scheme, stall of a motor for vehicles is controlled by setting a stall interval using a voltage resolution based on a sensor input of an alternating current (AC)-direct current (DC) converter (ADC converted) in the motor.

In a third scheme, a motor is stalled under a particular condition by detecting a waveform of a stall current during overrunning of the motor, that is, at the time of reaching a dimensional limit of the motor. For example, the motor may stall when a maximum voltage of a sawtooth wave detected by a stall current sensor exceeds about 60 mV.

In a fourth scheme, driving of a motor is restricted by driving a predetermined timer during continuous operation. For example, when a washer motor is driven, a maximum driving time may be restricted to about 30 seconds in consideration of durability.

In a fifth scheme, a motor is suspended by operating a circuit breaker based on an operating time of the motor. For example, an operating time of a power window motor is calculated, and the motor is suspended by operating a circuit breaker when the calculated operating time is greater than or equal to a predetermined time or longer than a non-operating time.

In a sixth scheme, power supplied to a motor is controlled based on heat generated from the motor. For example, power supplied to a motor is physically blocked using a bimetal when heat is generated by the motor.

In a seventh scheme, driving of a motor is controlled by setting a limit value of a stall current/voltage. For example, when a voltage sensing value of a motor in a direction of a driving shaft is detected to be less than or equal to a predetermined reference value, for example, about 1.5 V during power door cinching, stall is detected and a motor output is blocked.

In an eighth scheme, a driving area of a motor is restricted by setting ranges of a motor driving voltage and a sensor input. For example, a motor driving area may be restricted by setting a voltage sensing value in a direction of a driving shaft of a motor to a range of about 1.5 V to 4.5 V.

Motor detection schemes according to the eight related arts described above have disadvantages in that separate control logic and hardware are required for each device, and a component, which restricts a mechanical driving area of a motor and incurs additional cost, needs to be used. In particular, the bimetal and the limit switch have limitations on cost and setting of physical dimensions, and thus degrees of freedom of component arrangement and wiring are degraded. As a result, there has been a problem of increase in overall volume and weight of the motor. Moreover, the above limited time setting scheme, stall current detection scheme, etc. have a disadvantage in that control accuracy and performance are degraded due to a temperature, a dimensional limit, wear, etc.

SUMMARY

Accordingly, the present invention provides a method, an apparatus and a system for controlling a motor based on motor stall detection that substantially obviates one or more problems due to limitations and disadvantages of the related art. Another object of the present invention is to provide a method, an apparatus and a system for controlling a motor based on motor stall detection capable of dynamically changing various parameter values for motor driving control by collecting and learning sensing information while the motor is being driven.

Technical problems to be solved by the present invention are not limited to the above-mentioned technical problems, and other technical problems not mentioned herein may be clearly understood by those skilled in the art from description below.

The present invention provides a method, an apparatus and a system for controlling a motor based on motor stall. To achieve these objects and other advantages and in accordance with the purpose of the invention, as embodied and broadly described herein, a method of controlling a motor by a controller may include driving the motor based on an external control signal, receiving information regarding an output voltage of the motor at a predetermined motor detection cycle from a sensor that corresponds to the motor, setting a bottom value by comparing a level of the received output voltage of the motor with a preset limit value, and adjusting the limit value to the set bottom value when the level of the received output voltage of the motor exceeds the limit value a predetermined number of times corresponding to a predetermined threshold value.

In particular, a predetermined stall counter may be increased when the level of the output voltage of the motor exceeds the limit value, and the predetermined stall counter may be decreased when the level of the output voltage of the motor is less than the limit value, wherein the set bottom value may be released when the stall counter has a value of about 0. In addition, the motor may be determined to have stalled when the level of the received output voltage of the motor exceeds the limit value the predetermined number of times corresponding to the predetermined threshold value, and power supply to the motor may be blocked. In addition, a value of the output voltage of the motor received before an operation direction of the motor is changed may be set to the bottom value when the operation direction of the motor is changed while the bottom value is set.

In addition, the method may further include calculating a cumulative driving time of the motor after the motor is detected to have stalled, wherein the limit value is changed to an initial factory value when the motor is not detected to have stalled again until the cumulative driving time exceeds a predetermined reference value. The method may also include operating a predetermined cycle timer when the motor is driven, wherein the limit value may be changed to an initial factory value when the cycle timer expires a number of times corresponding to a predetermined maximum expiration count while the motor is not detected to have stalled.

Further, the method may include receiving information regarding a temperature and a motor operating speed from the sensor, collecting statistical data regarding a temperature characteristic for identifying a change in motor operating speed based on the temperature, generating a rule for correction of the limit value based on the statistical data regarding the temperature characteristic, and driving the motor using a parameter value corrected based on the generated rule for correction of the limit value.

In addition, the method may further include receiving information regarding a period and a peak voltage of a triangular wave supplied to the motor from the sensor, collecting statistical data regarding a characteristic of the triangular wave by analyzing a change pattern of the period and the peak voltage of the triangular wave based on operation durability, and correcting a minimum voltage of the triangular wave based on the collected statistical data regarding the characteristic of the triangular wave to maintain a peak voltage of the triangular wave at a predetermined reference value or greater. In addition, the method may further include receiving information regarding a reference axis for changing an operation direction of the motor from the sensor, and correcting the reference axis to an initial factory value when a cumulative error of the reference axis is equal to or greater than a predetermined reference value.

In another aspect of the present invention, a controller configured to drive a motor, may include a communication unit configured to receive an external control signal for the motor driving, a motor sensing information collection unit configured to receive information regarding an output voltage of the motor at a predetermined motor detection cycle from a sensor that corresponds to the motor when the motor is driven based on the external control signal, and a motor stall determination unit configured to set a bottom value by comparing a level of the received output voltage of the motor with a preset limit value, determining that the motor has stalled when the level of the received output voltage of the motor exceeds the limit value a predetermined number of times corresponding to a predetermined threshold value, and adjusting the limit value to the set bottom value.

Particularly, the motor stall determination unit may be configured to increase a predetermined stall counter when the level of the output voltage of the motor exceeds the limit value, and decrease the predetermined stall counter when the level of the output voltage of the motor is less than the limit value, wherein the motor stall determination unit may be configured to release the set bottom value when the stall counter has a value of about 0. In addition, the motor stall determination unit may be configured to determine that the motor has stalled when the level of the received output voltage of the motor exceeds the limit value the predetermined number of times corresponding to the predetermined threshold value.

In addition, the controller may further include a motor driving unit configured to operate the motor, wherein the motor driving unit may be configured to block power supply to the motor when the motor has stalled. The motor stall determination unit may be configured to set a value of the output voltage of the motor received before an operation direction of the motor is changed to the bottom value when the operation direction of the motor is changed while the bottom value is set.

The controller may further include a timer configured to calculate a cumulative driving time of the motor after the motor is detected to have stalled, wherein the motor stall determination unit may be configured to set the limit value to an initial factory value when the motor is not detected to have stalled again until the cumulative driving time exceeds a predetermined reference value. In addition, the controller may include a timer configured to drive a predetermined cycle timer when the motor is driven, wherein the motor stall determination unit may be configured to set the limit value to an initial factory value when the cycle timer expires a number of times corresponding to a predetermined maximum expiration count while the motor is not detected to have stalled.

Furthermore, the motor sensing information collection unit may further be configured to receive information regarding a temperature and a motor operating speed from the sensor to collect statistical data regarding a temperature characteristic for identifying a change in motor operating speed based on the temperature. In particular, the controller may include a parameter correction unit configured to generate a rule for correction of the limit value based on the statistical data regarding the temperature characteristic, wherein driving of the motor may be executed using a parameter value corrected based on the generated rule for correction of the limit value.

In addition, the motor sensing information collection unit may further be configured to receive information regarding a period and a peak voltage of a triangular wave supplied to the motor from the sensor to collect statistical data regarding a characteristic of the triangular wave by analyzing a change pattern of the period and the peak voltage of the triangular wave based on operation durability. The controller may further include a parameter correction unit configured to correct a minimum voltage of the triangular wave based on the collected statistical data regarding the characteristic of the triangular wave to maintain a peak voltage of the triangular wave at a predetermined reference value or greater. In addition, the parameter correction unit may further be configured to receive information regarding a reference axis for changing an operation direction of the motor from the sensor, and the parameter correction unit may be configured to correct the reference axis to an initial factory value when a cumulative error of the reference axis is equal to or greater than a predetermined reference value.

In another aspect of the present invention, it may be possible to provide a computer-readable recording medium recording a program for executing one of the methods of controlling the motor described above. In addition, it may be possible to provide a recording medium recording a computer-readable program to execute one of methods of controlling vehicle security communication.

It should be noted that the above-mentioned technical solutions are merely a part of exemplary embodiments of the present invention, and various exemplary embodiments reflecting technical characteristics of the present invention may be derived and understood by those skilled in the art from detailed description of the present invention given below.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 9 is a diagram illustrating a structure of a triangular wave and a V-T characteristic of the triangular wave according to operation durability according to an exemplary embodiment of the present invention.

DETAILED DESCRIPTION

Figure 1:
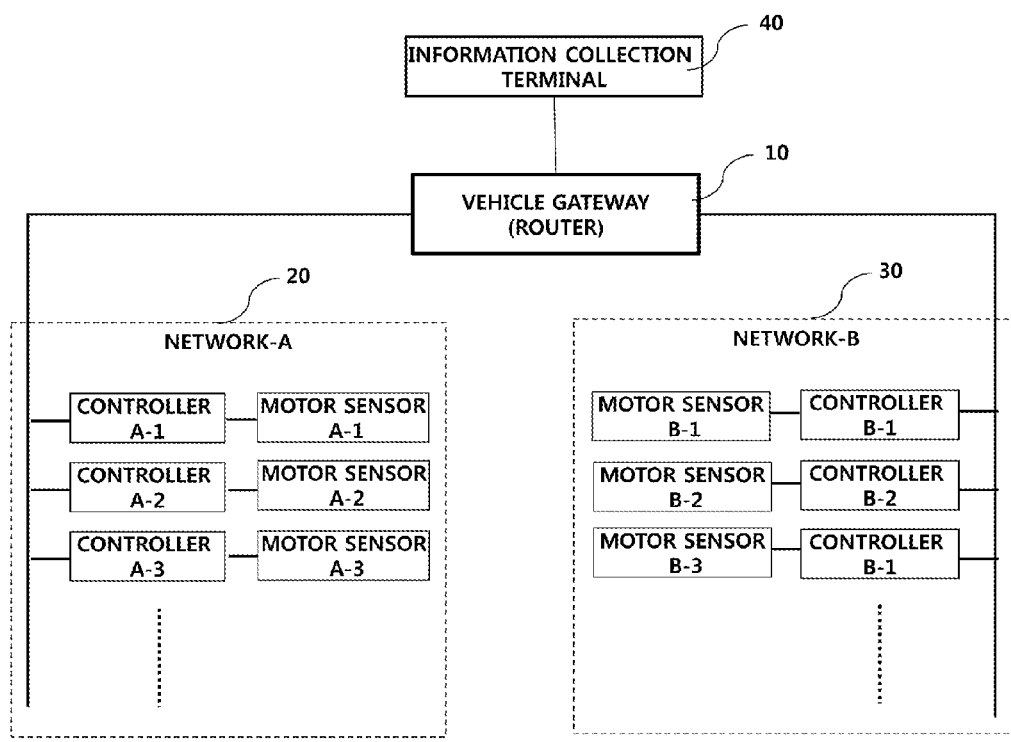
FIG. 1 is a block diagram for description of a vehicle motor control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to an apparatus and various methods to which the preferred embodiments of the present invention are applied.

Although all elements constituting the embodiments of the present invention are described as being integrated into a single one or operated as a single one, the present invention is not necessarily limited to such exemplary embodiments. According to exemplary embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present invention pertains.

All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless obviously defined in the present invention, such terms are not interpreted as having ideal or excessively formal meanings.

It will be understood that, although the terms first, second, A, B, (a), (b), etc. may be used herein to describe various elements of the present invention, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

FIG. 1 is a diagram for description of a vehicle motor control system according to an exemplary embodiment of the present invention. Referring to FIG. 1, the vehicle system may include controllers configured to operate motors having various uses and mechanical characteristics. The controllers configured to drive or operate the motor may correspond to a particular domain (network), and the controllers in the domain may be connected to the same network to communicate with each other. In addition, the controllers in the particular domain may communicate with a controller of another domain via a vehicle gateway 10. Examples of the domain may include a body domain, a chassis domain, a driver assistance system domain, a power train domain, a surround view domain, a head unit domain, etc. However, the invention is not limited thereto, and it should be noted that a name and a type of a corresponding domain may differ according to a vehicle manufacturer and a vehicle model.

In addition, a communication scheme between the vehicle gateway 10 and a network may be different for each domain, and an in-vehicle communication system may include a plurality of vehicle gateways. For example, examples of a communication scheme applicable to the in-vehicle communication system may include controller area network (CAN) communication, local interconnect network (LIN) communication, FlexRay communication, Ethernet communication, etc. However, the invention is not limited thereto.

Referring to FIG. 1, a controller A-1 (e.g., a first controller) included in a network A 20 may be configured to communicate with a controller B-1 (e.g., a second controller) included in a network B 30. In addition, information collected by controllers may be transmitted to an information collection terminal 40 via the vehicle gateway (or router) 10. In particular, the information collection terminal 40 may correspond to an on-board diagnostics (OBD) terminal. However, the invention is not limited thereto. According to another exemplary embodiment of the present invention, the information collection terminal 40 may correspond to a user terminal (e.g., a smartphone, a notebook, etc.) capable of accessing a vehicle head unit (not illustrated) connected to the vehicle gateway 10.

Each controller may be linked to a motor sensor to collect various types of sensing information from the motor sensor. Particularly, the sensing information may include output voltage information of a motor, information regarding a period and a peak voltage of a triangular wave for motor driving, temperature information, driving speed information of the motor, information regarding a noise deviation measured in the motor, current reference axis information, etc. However, the invention is not limited thereto.

Further, a controller may be configured to generate a rule for correction of a motor control limit value through learning using received sensing information, and reflect the generated rule in a lookup table. Thereafter, the controller may be configured to adaptively compensate for a limit value for dynamically adjusting motor driving with reference to the lookup table during motor driving. In general, the motor may undergo mechanical wear and change in electrical characteristics over time and according to an increase in the number of times of driving (e.g., an increase in use of the motor), that is, according to operation durability. As a result, various parameter values initially set for motor control, for example, various reference values for determining whether the motor has stalled, a reference axis for adjusting an operation direction of the motor, etc. may be invalid.

In addition, the motor may undergo change in operating characteristics based on change in external or internal environment, for example, temperature change, humidity change, etc. As an example, when an external temperature decreases, a driving speed of the motor may decrease. As another example, when an increase in humidity occurs simultaneously with decrease in external temperature, freezing may occur. As a result, a driving speed of the motor may decrease, and noise may occur. In particular, a determination as to whether the motor has stalled and adjustment of motor driving based on the determination are directly related to a lifespan of the motor. Additionally, various motor devices related to driving safety and user convenience affect customer satisfaction, and should be more accurately operated for safe driving.

Figure 2:
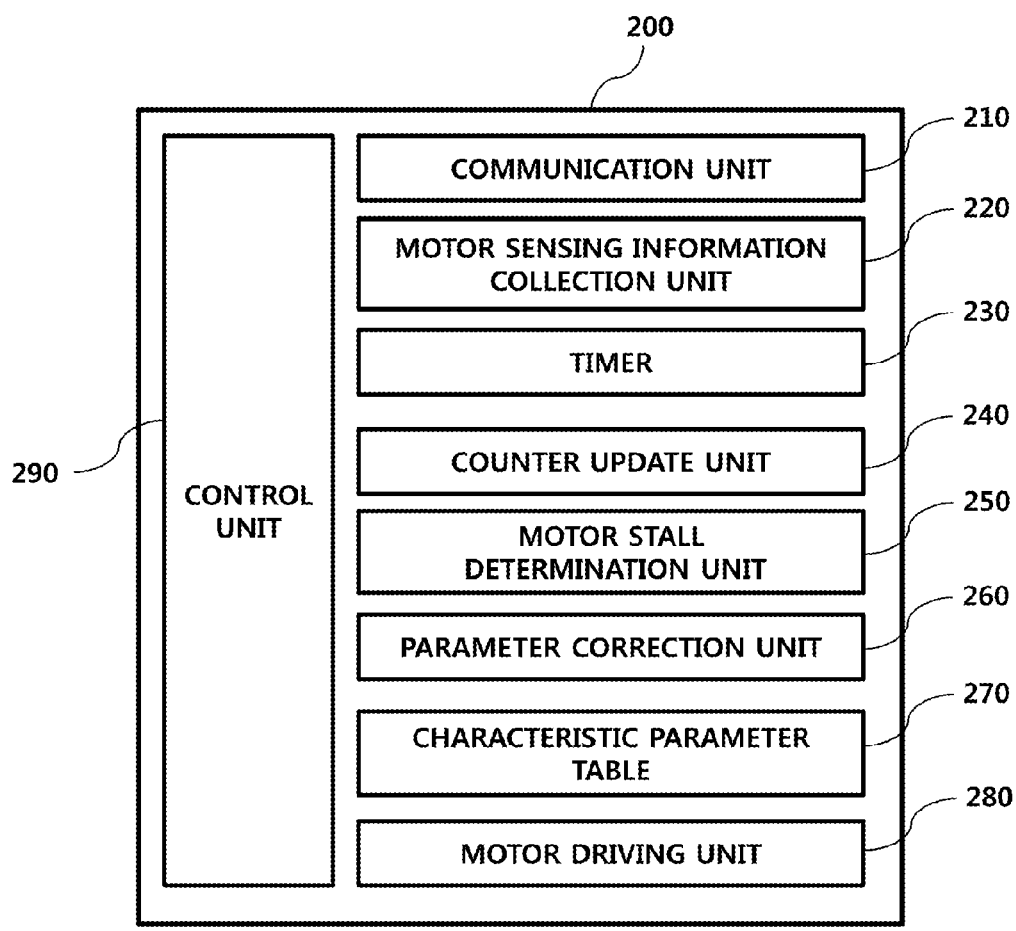
FIG. 2 is a block diagram illustrating an internal configuration of a controller for controlling motor driving according to an exemplary embodiment of the present invention.

FIG. 2 illustrates an internal configuration of a controller 200 configured to adjust motor driving according to an exemplary embodiment of the present invention. Referring to FIG. 2, the controller 200 may include a communication unit 210, a motor sensing information collection unit 220, a timer 230, a counter update unit 240, a motor stall determination unit 250, a parameter correction unit 260, a characteristic parameter table 270, a motor driving unit 280, and a control unit 290. The various units may be executed by controller 200 having a processor and a memory. It should be noted that the components of the controller 200 are not essential, and thus the controller 200 may include more components or fewer components. In addition, it should be noted that some components of the controller 200 may be configured as hardware or software, and may be merged or divided into two or more components when functions thereof are separated from each other.

The communication unit 210 may be configured to perform communication between controllers and communication with a motor sensor connected to a corresponding motor. In addition, the communication unit 210 may be configured to receive a clock signal (or message) for acquisition of synchronization necessary for an internal operation of the controller 200 from another controller.

The motor sensing information collection unit 220 may be configured to collect motor sensing information received from the communication unit 210 and statistically process the information. In particular, the motor sensing information may include output voltage information of the motor, information regarding a period and a peak voltage of a triangular wave for motor driving, temperature information of the motor, driving speed information of the motor, information regarding a noise deviation measured in the motor, current reference axis information, etc. However, the invention is not limited thereto. For example, the motor sensing information collection unit 220 may be configured to collect statistical data regarding change in motor output voltage based on a motor driving time and the number of times of driving the motor. In addition, the motor sensing information collection unit 220 may be configured to statistically process information regarding a period and a peak voltage of a triangular wave for motor driving based on a motor driving time and the number of times of driving the motor. The motor sensing information collection unit 220 may also be configured to collect statistical data regarding change in driving speed of the motor according to change in temperature.

In addition, the motor sensing information collection unit 220 may be configured to calculate a cumulative error of a reference axis using the reference axis information. Particularly, the reference axis may correspond to a reference value for adjusting an operation direction of the motor and determining a limit point of an operation of the motor. For example, when cumulative voltage consumption within an operation range of the motor which operates in a horizontal direction is about 0 to 5 V, an initial factory reference axis may be set to about 2.5 V. However, the initially set reference axis may be moved based on operation durability. Movement of the reference axis may be accumulative, and an error based on the movement may be accumulated. Thus, the motor may not operate normally. For example, when an error of a reference axis is accumulated in a door mirror, the mirror may not be completely closed or opened. Therefore, correction of the reference axis may be necessary for accurate operation of the motor.

The timer 230 may include a total driving time timer configured to calculate a total driving time of the motor, a motor sensing cycle timer configured to adjust a reception period of the motor sensing information received from the motor sensor, a cycle timer configured to calculate a driving time of the motor each time the motor is driven, etc. However, the invention is not limited thereto. The counter update unit 240 may include a stall counter configured to determine whether the motor has stalled, an operation durability counter configured to calculate an operation durability limit by counting the number of times of driving the motor, etc. However, the invention is not limited thereto.

The motor stall determination unit 250 may be configured to determine whether the motor has stalled based on a motor output voltage value received from the motor sensor according to an algorithm to be described below illustrated in FIG. 3, and adaptively update a limit register value for executing motor driving based on a determination result. For example, updated parameters may include a bottom value and a limit register value used to determine whether the motor has stalled of FIG. 3 to be described below. However, the invention is not limited thereto. In addition, the motor stall determination unit 250 may be configured to change the bottom value based on change of the operation direction of the motor, and set the limit register value to an initial factory value when a particular condition is satisfied. A specific operation of the motor stall determination unit 250 will become clearer through description of drawings below.

The parameter correction unit 260 may be configured to determine various parameters for dynamically operating the motor based on the statistical data collected by the motor sensing information collection unit 220, and reflect the determined parameters in the characteristic parameter table 270. For example, the parameter correction unit 260 may be configured to determine a limit value, which is to be used to determine whether the motor has stalled, to be corrected based on a characteristic change in voltage V and period T of a triangular wave according to operation durability, and record the determined threshold value in the characteristic parameter table 270.

In addition, the parameter correction unit 260 may be configured to determine logic for compensating for a motor driving speed for each temperature based on a change in motor driving speed according to a change in temperature, and record the determined logic in the characteristic parameter table 270. For example, the parameter correction unit 260 may be configured to calculate a motor driving speed decrease rate based on a decrease in temperature, determine a motor driving voltage level for inverse compensation that corresponds to the decrease rate, and record the determined level in the characteristic parameter table 270. For example, particular parameter values, for example, a motor driving voltage, a revolutions per minute (RPM) of the motor, etc. may be determined to allow a motor driving speed to increase by about 10% compared to a reference motor driving speed each time a temperature decreases by about 4° C.

When a reference axis, which serves as a standard for a change of a direction of the motor, changes, the parameter correction unit 260 according to the present embodiment may be configured to correct the reference axis. In general, when the motor is driven repeatedly, a reference axis for determining a limit value of the motor in a particular direction may gradually change. When a cumulative error of the reference axis increases, a movement limit point of the motor may change. For example, when an error of the reference axis accumulates, a side-view mirror may not be completely unfolded or folded in towards to the vehicle.

Therefore, the parameter correction unit 260 may be configured to dynamically correct an error in the reference axis based on learning data regarding a change amount of the reference axis according to operation durability. For example, an error in the reference axis may be calculated and recorded when the motor, which moves in right and left directions, is alternately driven about 500 times (e.g., for about 2,000 seconds) at a cycle of four seconds, and the reference axis may be corrected based on previous errors in the reference axis calculated about every 500 times.

The motor driving unit 280 may be configured to execute motor driving based on a control signal of the control unit 290. For example, the motor driving unit 280 may be configured to turn power supplied to the motor on and off based on a predetermined control signal of the control unit 290. In addition, the motor driving unit 280 may be configured to change a driving direction of the motor based on a control signal of the control unit 290. For example, the motor driving unit 280 may be configured to change a driving direction of the motor by changing a direction of a current applied to the motor or by shifting a phase.

Further, the motor driving unit 280 may be configured to supply a triangular wave (e.g., alternating current (AC) power) necessary for motor driving to the motor. Furthermore, the motor driving unit 280 may be configured to correct a minimum voltage Vm of the triangular wave to maintain a peak voltage Vp of the triangular wave at a predetermined reference value or greater based on a control signal of the control unit 290. The control unit 290 may be configured to execute the overall operation of the controller 200.

Figure 3:
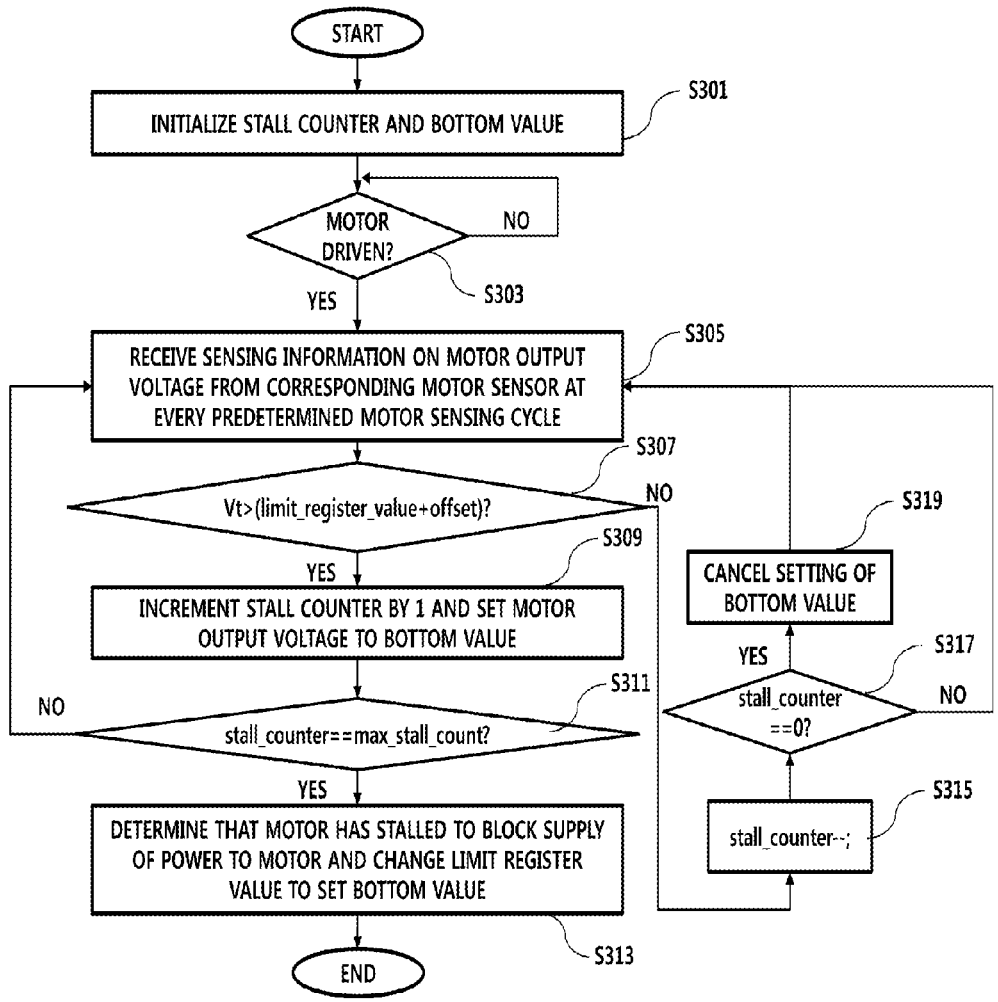
FIG. 3 is a flowchart illustrating a method of dynamically changing a parameter for determining whether a motor stalls in a controller configured to drive a motor according to an exemplary embodiment of the present invention.

FIG. 3 illustrates a method of dynamically changing a parameter for determining whether the motor has stalled in the controller configured to execute and adjust motor driving according to an exemplary embodiment of the present invention. Referring to FIG. 3, in S301, the controller 200 may be configured to initialize a stall counter and a bottom value.

When the motor is driven based on an external control signal in S303, the controller 200 may be configured to receive sensing information on a motor output voltage Vt from a corresponding motor sensor at every predetermined motor sensing cycle in S305. In S307, the controller 200 may be configured to compare whether the motor output voltage Vt is greater than a predetermined limit value. In particular, the limit value may correspond to a sum of an offset value and a limit register value stored in advance. When the motor output voltage Vt is greater than the limit value as a result of comparison in S307, the controller 200 may be configured to increment the stall counter by 1, and set the motor output voltage Vt to the bottom value in S309.

Subsequently, in S311, the controller 200 may be configured to determine whether a current stall counter value is equal to a predefined maximum stall count. In S313, when the current stall counter value is equal to the predefined maximum stall count as a result of determination, the controller 200 may be configured to determine that the motor has stalled to block supply of power to the motor and change the limit register value to the bottom value set in S309. Particularly, the limit register value may be recorded in a nonvolatile memory, for example, an electrically erasable programmable read-only memory (EEPROM), and maintained irrespective of whether the vehicle is started.

When the motor output voltage Vt does not exceed the limit value in S307, the controller 200 may be configured to decrement the stall counter by 1, and then compare whether the stall counter is equal to 0 in S315 to S317. When the stall counter is equal to 0 as a result of comparison, the controller 200 may be configured to cancel the bottom value set in S309 and return to S305. Meanwhile, when the current stall counter value is not equal to the predefined maximum stall count as a result of determination in S311, the controller 200 may return to S305 described above. In addition, when the stall counter is not equal to 0 in S317, the controller 200 may return to S305 described above.

Figure 4:
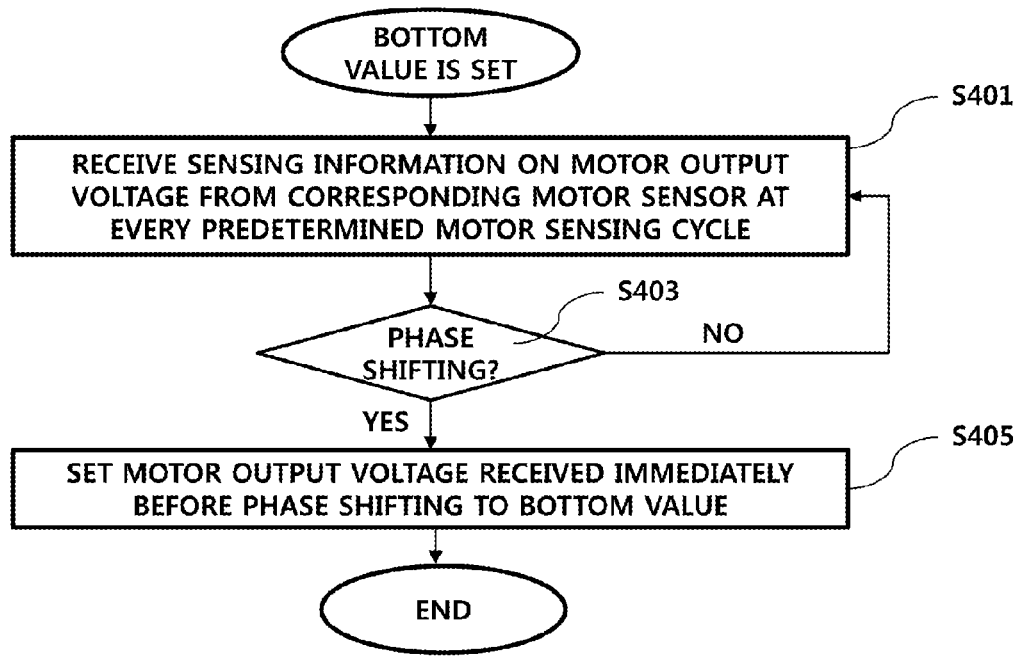
FIG. 4 is a flowchart illustrating a method of dynamically changing a parameter for determining whether the motor has stalled in the controller configured to drive a motor according to another exemplary embodiment of the present invention.

FIG. 4 illustrates a method of dynamically changing a parameter for determining whether the motor has stalled in the controller configured to execute motor driving according to another exemplary embodiment of the present invention. Referring to FIG. 4, in S401, the controller 200 may be configured to receive sensing information regarding a motor output voltage Vt from a corresponding motor sensor at every predetermined motor sensing cycle while a bottom value (e.g., a lowest value) is set. In response to determining a change in driving direction of the motor based on an external control signal, that is, upon detection of phase shift, the controller 200 may be configured to set a motor output voltage Vt received before phase shifting to the bottom value in S403 to S405.

Figure 5:
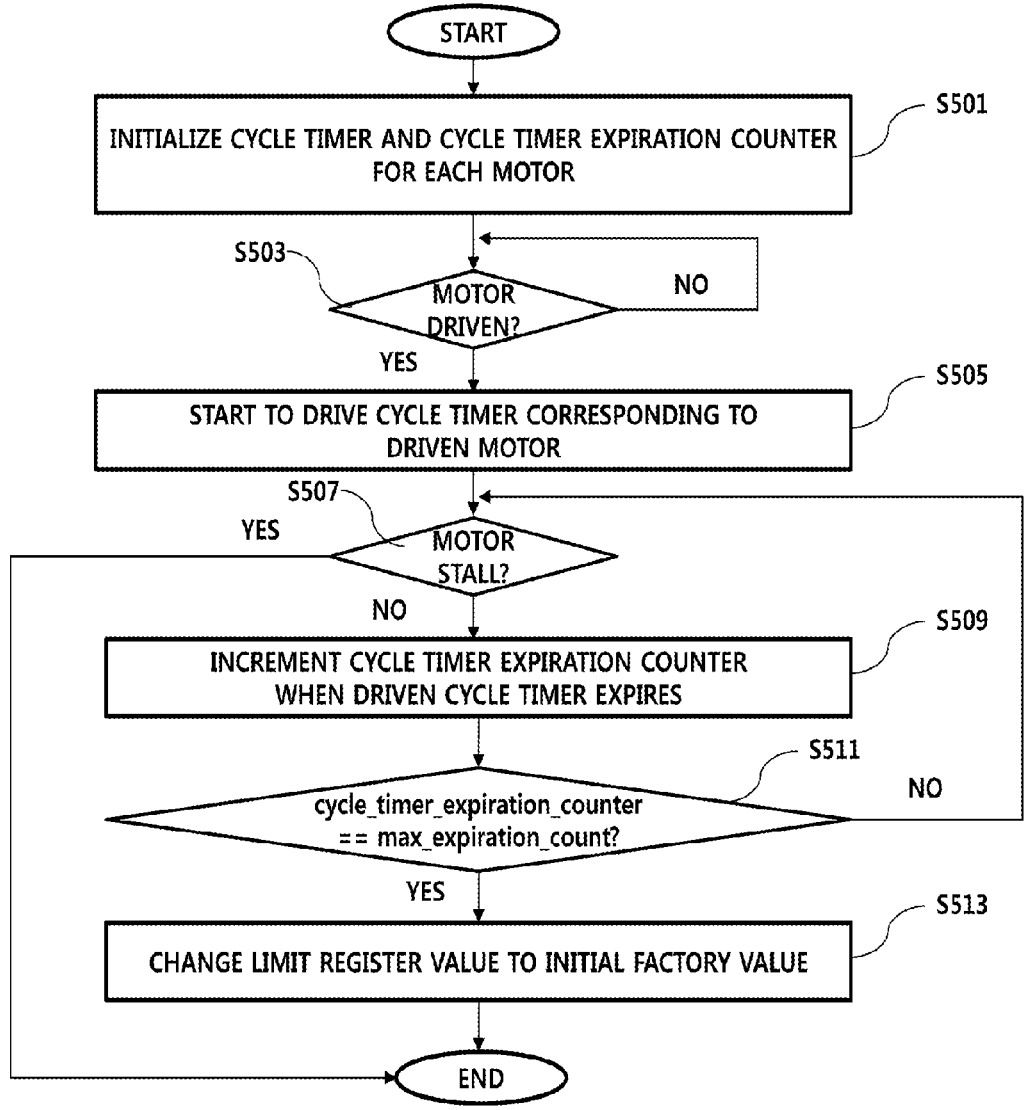
FIG. 5 is a flowchart illustrating a method of dynamically changing a parameter for determining whether the motor has stalled in the controller configured to drive a motor according to another exemplary embodiment of the present invention.

FIG. 5 illustrates a method of dynamically changing a parameter for determining whether the motor has stalled in the controller configured to execute motor driving according to another exemplary embodiment of the present invention. Referring to FIG. 5, in S501, the controller 200 may be configured to initialize a cycle timer and a cycle timer expiration counter for each motor. Thereafter, when a motor is driven based on an external control signal, the controller 200 may be configured to drive or operate a cycle timer that corresponds to the driven motor in S503 to S505.

In this instance, in response to determining that the motor has stalled according to the method of FIG. 3, the controller 200 may be configured to change a limit register value to the set bottom value and store the changed value. Further, when the driven cycle timer expires while the motor does not stall, the controller 200 may be configured to increment the cycle timer expiration counter by 1, and compare whether the cycle timer expiration counter is equal to a predetermined maximum expiration counter in S509 to S511.

When the cycle timer expiration counter is equal to the predetermined maximum expiration counter as a result of determination, the controller 200 may be configured to change the limit register value to an initial factory value, that is, an initial limit register set value in S513. When the cycle timer expiration counter is not equal to the predetermined maximum expiration counter in S511, for example, when the cycle timer expiration counter is less than the predetermined maximum expiration counter, the controller 200 may return to S507 described above and verify whether the motor has stalled. Through the above-described method of FIG. 5, the controller 200 may be configured to prevent a failure in detection of motor stall due to a continuous increase in limit register value.

Figure 6:
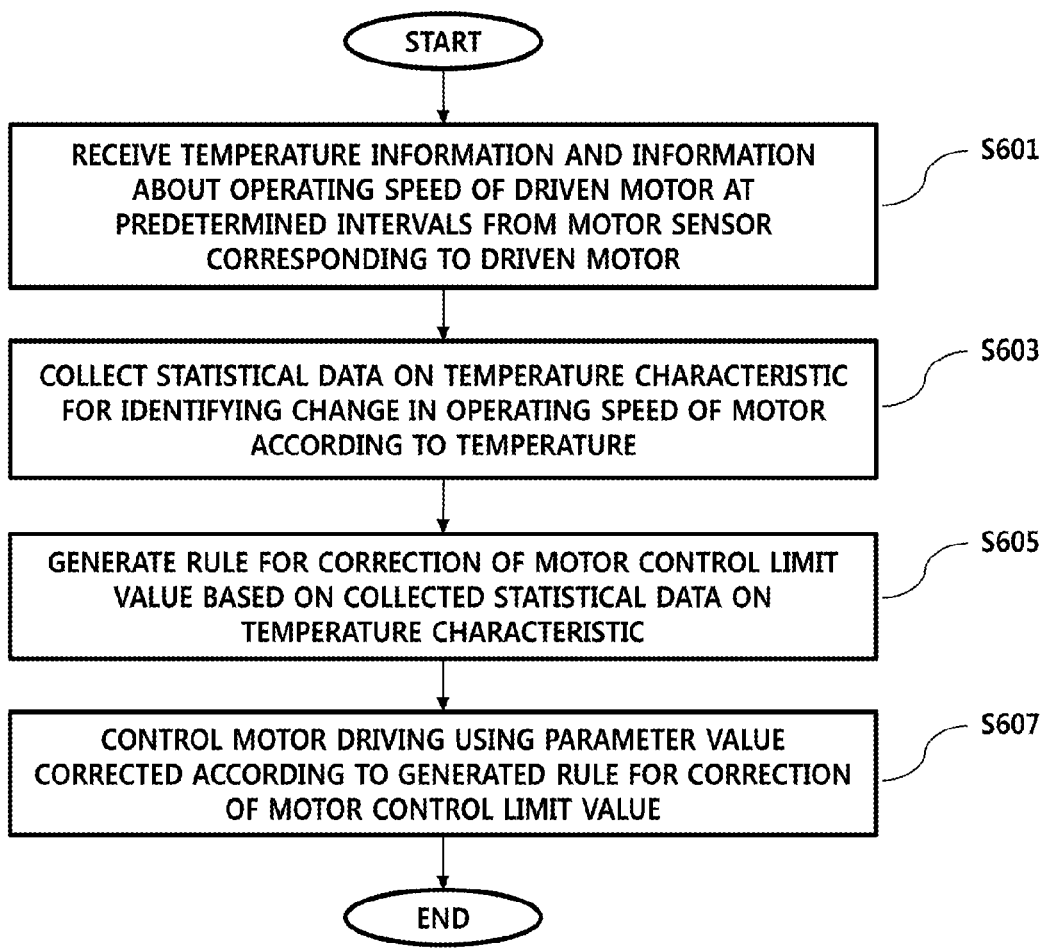
FIG. 6 is a flowchart illustrating a method of dynamically changing a parameter for determining whether the motor has stalled in the controller configured to drive a motor according to another exemplary embodiment of the present invention.

FIG. 6 illustrates a method of dynamically changing a parameter for determining whether the motor has stalled in the controller configured to execute motor driving according to another exemplary embodiment of the present invention. Referring to FIG. 6, in S601, the controller 200 may be configured to receive temperature information and information regarding an operating speed of a driven motor at predetermined intervals from a motor sensor that corresponds to the motor.

In S603 to S605, the controller 200 may be configured to collect statistical data regarding a temperature characteristic for identifying a change in operating speed of the motor based on temperature, and generate a rule for correction of a motor control limit value based on the collected statistical data regarding the temperature characteristic. Thereafter, in S607, the controller 200 may be configured to execute or adjust motor driving using a parameter value corrected based on the generated rule for correction of the motor control limit value. As an example, when a temperature decreases, a driving speed of the motor decreases, and thus the controller 200 may be configured to correct a predetermined driving time restriction parameter for adjusting a driving time of the motor to a greater value. As another example, the controller 200 may be configured to correct a predetermined motor driving speed control parameter for increasing a driving speed of the motor as temperature decreases.

Figure 7:
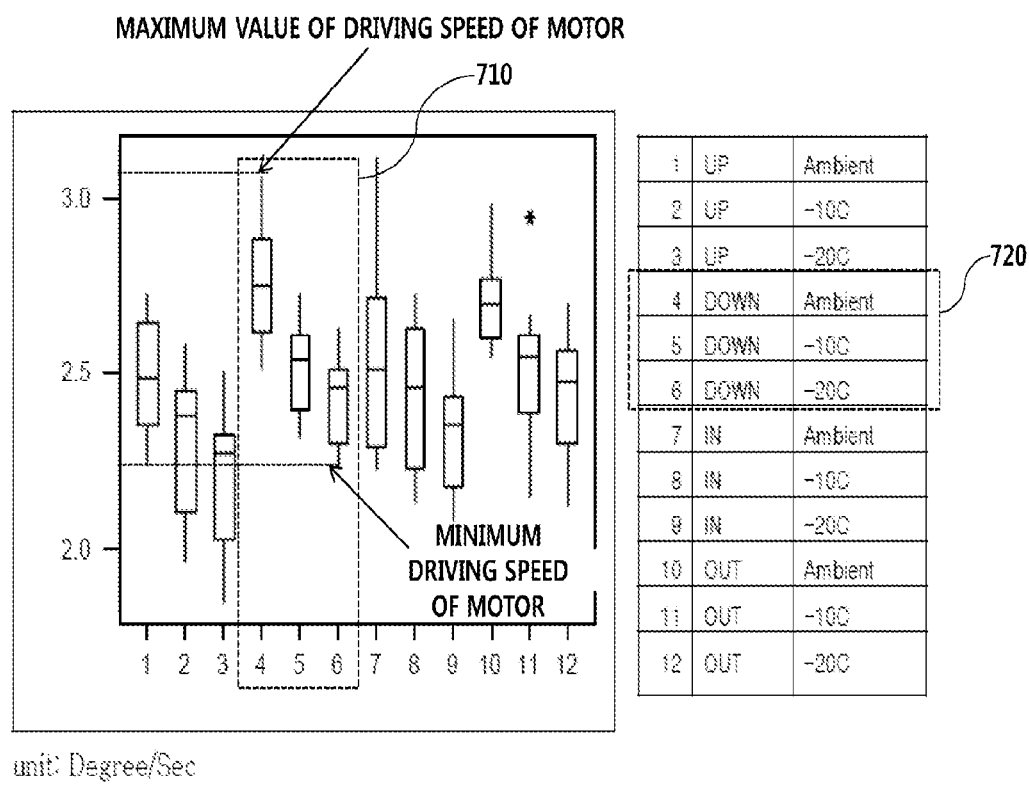
FIG. 7 is a diagram illustrating experimental data for description of a change in driving speed of the motor in response to a temperature change according to an exemplary embodiment of the present invention.

FIG. 7 illustrates experimental data illustrating a change in driving speed of the motor in response to temperature change according to an exemplary embodiment of the present invention. Specifically, FIG. 7 illustrates a box plot showing a change in driving speed of a mirror driving motor when the motor is driven in a particular direction, for example, upward/downward/inward/outward at ambient temperature and at low temperature (e.g., about −10° C. and −20° C.) to detect a lower part of a dimensional limit of the motor.

Boxes 710 and 720 of FIG. 7 indicate that, when the motor is driven downward, an average motor driving speed decreases as a temperature decreases. The box 710 indicates that a maximum speed is about 3.1 degrees/sec, a minimum speed is about 2.2 degrees/sec, and an average speed is about 2.6 degrees/sec in motor driving speeds of cases 4, 5, and 6 on an x-axis. Similarly, it may be understood that an average motor driving speed decreases as temperature decreases when the motor is driven in another particular direction.

According to an exemplary embodiment of the present invention, statistical information regarding a change in motor driving speed may be collected based on a change in temperature for each motor type, the collected information may be reflected in a lookup table of a controller, and a limit value for adjusting motor driving may be adaptively corrected with reference to the lookup table based on temperature value sensed during motor driving. For example, the controller may be configured to correct the limit value for adjusting motor driving to cause a motor driving speed to gradually increase within a range of an operating speed of the motor that corresponds to a conventional reference specification as temperature decreases.

Figure 8:
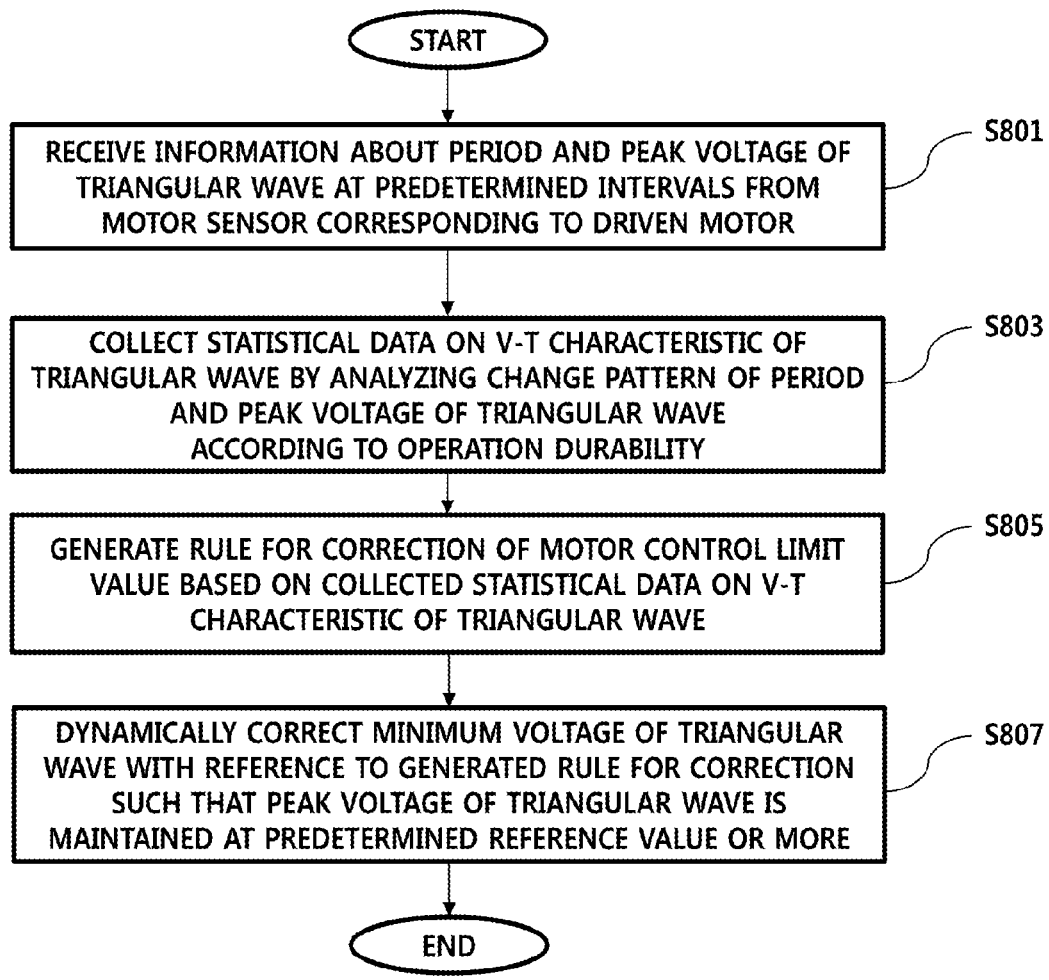
FIG. 8 is a flowchart illustrating a method of dynamically changing a parameter for determining whether the motor has stalled in the controller configured to drive a motor according to another exemplary embodiment of the present invention.

FIG. 8 illustrates a method of dynamically changing a parameter for determining whether the motor has stalled in the controller configured to execute motor driving according to another exemplary embodiment of the present invention. Referring to FIG. 8, in S801, a controller 200 may be configured to receive information regarding a period T and a peak voltage Vp of a triangular wave at predetermined intervals from a motor sensor that corresponds to a driven motor.

In S803, the controller 200 may be configured to collect statistical data regarding a V-T characteristic of the triangular wave by analyzing a change pattern of the period T and the peak voltage Vp of the triangular wave based on operation durability. For example, the controller 200 may be configured to collect statistical data for identifying a change in period and peak voltage of the triangular wave based on the number of times of driving the motor or a cumulative motor driving time. The controller 200 may be configured to generate a rule for correction of a motor control limit value based on the collected statistical data regarding the V-T characteristic of the triangular wave in S805, and dynamically correct a minimum voltage Vm of the triangular wave with reference to the generated rule for correction to maintain the peak voltage Vp of the triangular wave at a predetermined reference value or greater in S807.

FIG. 9 illustrates a structure of a triangular wave and a V-T characteristic of the triangular wave based on operation durability according to an exemplary embodiment of the present invention. Referring to FIG. 9, a box 900 shows the structure of the triangular wave. The triangular wave may be defined by a voltage V and a period T.

A box 910 shows a distribution of voltages of the triangular wave based on operation durability. Specifically, the box 910 shows a distribution of voltages of the triangular wave based on a driving direction at an initial driving time and a time that corresponds to half of an operation durability limit (e.g., about 5,000 cycles) for a motor, which has the operation durability limit of about 10,000 cycles. The box 910 shows that an overall voltage level is high when the motor is driven upward, and shows a characteristic in which an average voltage level decreases and a variance increases based on operation durability in the same motor driving direction.

A box 920 shows a distribution of periods of the triangular wave based on operation durability. Specifically, the box 920 shows a distribution of periods of the triangular wave based on a driving direction at an initial driving time and a time that corresponds to half of an operation durability limit (e.g., about 5,000 cycles) for a motor, which has the operation durability limit of about 10,000 cycles. The box 920 shows that an overall period value is high when the motor is driven upward, and shows a characteristic in which an average period value decreases and a variance decreases based on operation durability in the same motor driving direction.

Effects of the method and apparatus according to the present invention are described below.

The present invention has an advantage of providing a method, an apparatus and a system for controlling a motor based on motor stall detection. In addition, the present invention has an advantage of providing a method, an apparatus and a system for controlling a motor based on motor stall detection capable of dynamically changing various parameter values for motor driving control by collecting and learning sensing information during motor driving. The present invention also has an advantage of providing a general-purpose motor operation control logic for each motor type. The present invention has an advantage of enhancing reliability of a motor system by determining and dynamically setting a motor driving control limit value and various parameters based on statistical data learned based on sensing information collected during motor driving.

Effects that may be obtained from the present invention are not limited to the above-mentioned effects, and other effects not mentioned herein may be clearly understood by those skilled in the art from the above description. Those skilled in the art will appreciate that the present invention may be executed in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein.

What is claimed is:

1. A method of controlling a motor in a controller, comprising:
    driving, by a motor driving unit, the motor based on an external control signal;
    receiving, by a motor sensing information collection unit, information regarding an output voltage of the motor at a predetermined motor detection cycle from a sensor that corresponds to the motor;
    setting, by a motor stall determination unit, a bottom value by comparing a level of the received output voltage of the motor with a preset limit value; and
    changing, by the motor stall determination unit, the limit value to the set bottom value when the level of the received output voltage of the motor exceeds the limit value a predetermined number of times corresponding to a predetermined threshold value.

2. The method according to claim 1, wherein a predetermined stall counter is increased when the level of the output voltage of the motor exceeds the limit value, and the predetermined stall counter is decreased when the level of the output voltage of the motor is less than the limit value, wherein the set bottom value is released when the stall counter has a value of about 0.

3. The method according to claim 2, wherein the motor is determined to have stalled when the level of the received output voltage of the motor exceeds the limit value the predetermined number of times corresponding to the predetermined threshold value, and power supply to the motor is blocked.

4. The method according to claim 1, wherein a value of the output voltage of the motor received before an operation direction of the motor is changed is set to the bottom value when the operation direction of the motor is changed while the bottom value is set.

5. The method according to claim 1, further comprising:
calculating, by a timer, a cumulative driving time of the motor after the motor is detected to have stalled,
wherein the limit value is changed to an initial factory value when the motor is not detected to have stalled again until the cumulative driving time exceeds a predetermined reference value.

6. The method according to claim 1, further comprising:
operating, by a timer, a predetermined cycle timer when the motor is driven,
wherein the limit value is changed to an initial factory value when the cycle timer expires a number of times corresponding to a predetermined maximum expiration count while the motor is not detected to have stalled.

7. The method according to claim 1, further comprising:
receiving, by the motor sensing information collection unit, information regarding a temperature and a motor operating speed from the sensor;
collecting, by the motor sensing information collection unit, statistical data regarding a temperature characteristic for identifying a change in motor operating speed based on the temperature;
generating, by a parameter correction unit, a rule for correction of the limit value based on the statistical data regarding the temperature characteristic; and
adjusting, by a controller, driving of the motor using a parameter value corrected based on the generated rule for correction of the limit value.

8. The method according to claim 1, further comprising:
receiving, by the motor sensing information collection unit, information regarding a period and a peak voltage of a triangular wave supplied to the motor from the sensor;
collecting, by the motor sensing information collection unit, statistical data regarding a characteristic of the triangular wave by analyzing a change pattern of the period and the peak voltage of the triangular wave based on operation durability; and
correcting, by a parameter correction unit, a minimum voltage of the triangular wave based on the collected statistical data regarding the characteristic of the triangular wave to maintain a peak voltage of the triangular wave at a predetermined reference value or greater.

9. The method according to claim 1, further comprising:
receiving, by the motor sensing information collection unit, information regarding a reference axis for changing an operation direction of the motor from the sensor; and
correcting, by a parameter correction unit, the reference axis to an initial factory value when a cumulative error of the reference axis is equal to or greater than a predetermined reference value.

10. A controller configured to execute driving of a motor, comprising:
a communication unit configured to receive an external control signal for the motor driving;
a motor sensing information collection unit configured to receive information regarding an output voltage of the motor at a predetermined motor detection cycle from a sensor that corresponds to the motor when the motor is driven based on the external control signal; and
a motor stall determination unit configured to set a bottom value by comparing a level of the received output voltage of the motor with a preset limit value, determine that the motor has stalled when the level of the received output voltage of the motor exceeds the limit value a predetermined number of times corresponding to a predetermined threshold value, and change the limit value to the set bottom value.

11. The controller according to claim 10, wherein the motor stall determination unit is configured to increase a predetermined stall counter when the level of the output voltage of the motor exceeds the limit value, and decrease the predetermined stall counter when the level of the output voltage of the motor is less than the limit value, wherein the motor stall determination unit is configured to release the set bottom value when the stall counter has a value of about 0.

12. The controller according to claim 11, wherein the motor stall determination unit is configured to determine that the motor has stalled when the level of the received output voltage of the motor exceeds the limit value the predetermined number of times corresponding to the predetermined threshold value.

13. The controller according to claim 12, further comprising:
a motor driving unit configured to execute an operation of the motor,
wherein the motor driving unit is configured to block power supply to the motor when the motor has stalled.

14. The controller according to claim 10, wherein the motor stall determination unit is configured to set a value of the output voltage of the motor received before an operation direction of the motor is changed to the bottom value when the operation direction of the motor is changed while the bottom value is set.

15. The controller according to claim 10, further comprising:
a timer configured to calculate a cumulative driving time of the motor after the motor is detected to have stalled,
wherein the motor stall determination unit is configured to set the limit value to an initial factory value when the motor is not detected to have stalled again until the cumulative driving time exceeds a predetermined reference value.

16. The controller according to claim 10, further comprising:
a timer configured to operate a predetermined cycle timer when the motor is driven,
wherein the motor stall determination unit is configured to set the limit value to an initial factory value when the cycle timer expires a number of times corresponding to a predetermined maximum expiration count while the motor is not detected to have stalled.

17. The controller according to claim 10, wherein the motor sensing information collection unit is configured to receive information regarding a temperature and a motor operating speed from the sensor to collect statistical data regarding a temperature characteristic for identifying a change in motor operating speed based on the temperature.

18. The controller according to claim 17, further comprising:
a parameter correction unit configured to generate a rule for correction of the limit value based on the statistical data regarding the temperature characteristic, wherein driving of the motor is adjusted using a parameter value corrected based on the generated rule for correction of the limit value.

19. The controller according to claim 10, wherein the motor sensing information collection unit is configured to receive information regarding a period and a peak voltage of a triangular wave supplied to the motor from the sensor to collect statistical data regarding a characteristic of the triangular wave by analyzing a change pattern of the period and the peak voltage of the triangular wave based on operation durability.

20. The controller according to claim 19, further comprising:
 a parameter correction unit configured to correct a minimum voltage of the triangular wave based on the collected statistical data regarding the characteristic of the triangular wave to maintain a peak voltage of the triangular wave at a predetermined reference value or greater,
 wherein the parameter correction unit is configured to receive information regarding a reference axis for changing an operation direction of the motor from the sensor, and the parameter correction unit is configured to correct the reference axis to an initial factory value when a cumulative error of the reference axis is equal to or greater than a predetermined reference value.

* * * * *